(12) United States Patent
Dunko

(10) Patent No.: US 9,179,056 B2
(45) Date of Patent: Nov. 3, 2015

(54) IMAGE CAPTURING SYSTEMS WITH CONTEXT CONTROL AND RELATED METHODS

(75) Inventor: Gregory A. Dunko, Cary, NC (US)

(73) Assignee: HTC CORPORATION, Taoyuan (TW)

( * ) Notice: Subject to any disclaimer, the term of this patent is extended or adjusted under 35 U.S.C. 154(b) by 427 days.

(21) Appl. No.: 13/550,022

(22) Filed: Jul. 16, 2012

(65) Prior Publication Data
US 2014/0015965 A1 Jan. 16, 2014

(51) Int. Cl.
*H04N 5/232* (2006.01)
*H04N 5/235* (2006.01)

(52) U.S. Cl.
CPC ............. *H04N 5/232* (2013.01); *H04N 5/2352* (2013.01); *H04N 5/23222* (2013.01)

(58) Field of Classification Search
CPC . H04N 5/232; H04N 5/2352; H04N 5/23222; H04N 5/765; H04N 5/781
See application file for complete search history.

(56) References Cited

U.S. PATENT DOCUMENTS

| | | | |
|---|---|---|---|
| 8,508,622 B1* | 8/2013 | Anon | 348/231.99 |
| 2003/0103138 A1* | 6/2003 | Assayag et al. | 348/143 |
| 2009/0231441 A1* | 9/2009 | Walker et al. | 348/207.1 |
| 2010/0141802 A1* | 6/2010 | Knight et al. | 348/240.3 |
| 2012/0081574 A1* | 4/2012 | Kawakami | 348/231.3 |

OTHER PUBLICATIONS

Office Action received for corresponding Taiwan patent application (dated May 13, 2015).

* cited by examiner

*Primary Examiner* — Jefferey Harold
*Assistant Examiner* — Sean Haiem
(74) *Attorney, Agent, or Firm* — McClure, Qualey & Rodack, LLP

(57) ABSTRACT

Image capturing systems with context control and related methods are provided. In this regard, a representative image capturing system includes: an image capturing device having a user-adjustable setting for altering an image capture parameter; and a context control system operative to receive location information corresponding to a location of the image capturing device and to preset the user-adjustable setting based, at least in part, on the location information.

18 Claims, 3 Drawing Sheets

IMAGE CAPTURING SYSTEMS WITH CONTEXT CONTROL AND RELATED METHODS

TECHNICAL FIELD

The present disclosure generally relates to image capturing devices.

BACKGROUND

Digital cameras, such as those onboard mobile phones, are becoming increasingly complex. Because of this, it now may take an unacceptable amount of time for a user and/or user device to adjust the various settings of the camera in order to be able to capture an image. Notably, these settings may include light settings, viewfinder settings and focus settings, among others.

SUMMARY

Image capturing systems with context control and related methods are provided. Briefly described, one embodiment, among others, is an image capturing system comprising: an image capturing device having a user-adjustable setting for altering an image capture parameter; and a context control system operative to receive location information corresponding to a location of the image capturing device and to preset the user-adjustable setting based, at least in part, on the location information.

Another embodiment is a method for capturing images, comprising: receiving location information corresponding to a location of an image capturing device; and presetting a user-adjustable setting of the image capturing device based, at least in part, on the location information.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
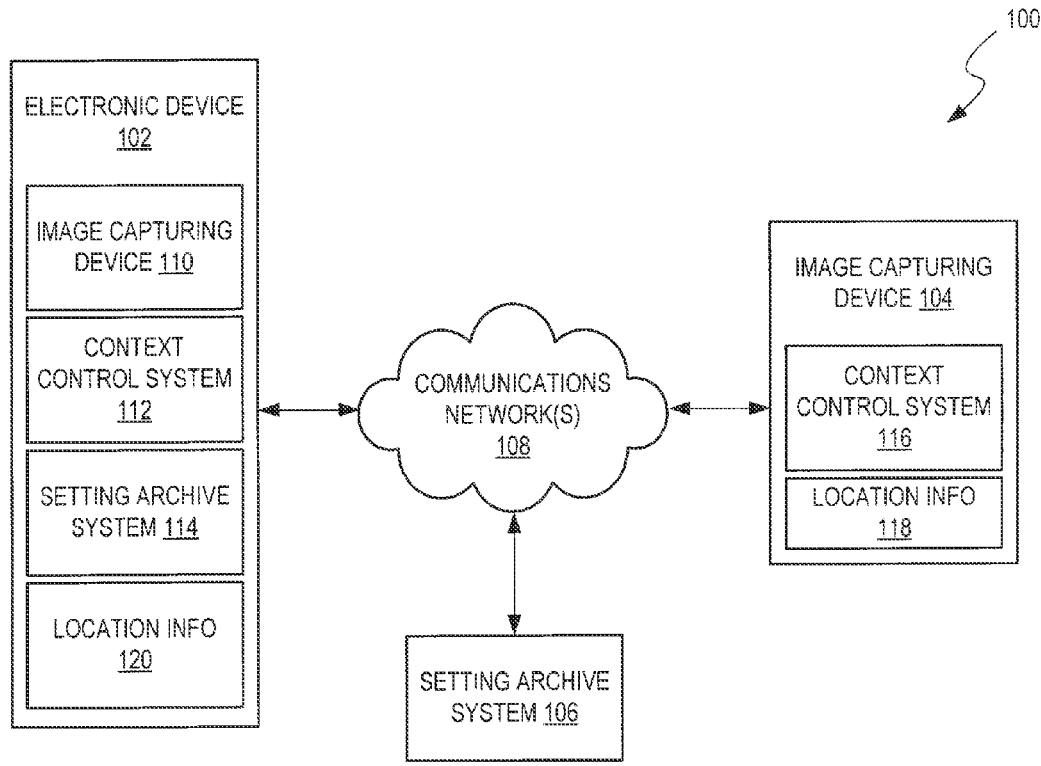
FIG. 1 is a schematic diagram of an example embodiment of an imaging system.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

In this regard, image capturing systems with context control and related methods are provided, which involve presetting user-adjustable settings (e.g., focal length, lighting and resolution) of image capturing devices. In some array-type camera systems, array parameters (such as what number and types of sensors in the array are to be used) could be reconfigured. In some embodiments, location information corresponding to a current location of an image capturing device is used to facilitate presetting of one or more of the user-adjustable settings of the device. By obtaining location information, the local environment may be assessed and then correlated with desirable user-adjustable settings. By way of example, if the location information indicates that the image capturing device is within a building that has a largest room dimension of 50 feet, the focal length of the image capturing device may be preset to a focal length value of less than 50 feet and a lighting value associated with indoor image capture.

In some embodiments, location information may be correlated with prior values of the user-adjustable settings that were actually used at the location. Thus, if it is determined that the image capturing device is at the location again, the archived settings may be used for presetting the device. In some embodiments, the archived settings may be associated with a different image capturing device that acquired images at the location. As such, the archived settings associated with another device may be used for presetting the device.

Additionally, or alternatively, information other than location information may be considered in presetting various values of an image capturing device. For instance, calendar information corresponding to upcoming events that are to be attended by a user of the image capturing device may be considered. Such an event may be associated with a venue and a time, information of which may be useful in presetting various settings such as focal length, lighting and resolution, among others.

FIG. 1 is a schematic diagram of an example embodiment of an imaging system. As shown in FIG. 1, system 100 includes an electronic device 102 (such as a smartphone or tablet computer, for example), an image capturing device 104 (such as a digital camera, for example) and a setting archive system 106, each of which is configured to communicate via communications network 108. Notably, communications network 106 may include one or more of various networks that may use various protocols for communication. Additionally, electronic device 102 incorporates an image capturing device 110, a context control system 112 and a setting archive system 114. Image capturing device 104 incorporates a context control system 116.

Each of the image capturing devices is able to acquire images in accordance with the set values of various user-adjustable settings of the respective devices. A non-exhaustive and non-limiting list of user-adjustable settings includes focal length, exposure time, supplemental lighting (e.g., flash, flash depth or intensity), image resolution, etc. Notably, each user-adjustable setting is capable of altering an image capture parameter (e.g., supplemental lighting alters light level) that may influence image data acquired by the device.

With respect to image capturing device 104, context control system 116 is operative to receive location information 118 corresponding to a current location of the image capturing device. This may be facilitated in various manners, such as by receiving inputs to an onboard GPS system (not shown), for example. Alternative solutions may include a location identifying beacon or other location or place determination or identification system, for example. Context control system 116 uses the location information to preset at least one of the user-adjustable settings of device 104 such that the user-adjustable settings exhibit the corresponding preset values for use. By way of example, if the location information corresponds to the location of a restaurant, the context control system may preset the resolution setting to a value that is common when taking indoor pictures. For instance, the resolution may be set to low responsive to the image capture device being turned on. This solution may be realized through use of a look-up table that contains locations and the associated image capture settings associated with that location. Such a look-up table may be resident on the device or may be accessed on a remote server or cloud service.

With respect to electronic device 102, context control system 112 is operative to receive location information 120 corresponding to a current location of the electronic device. Context control system 112 uses the location information to preset at least one of the user-adjustable settings of the image capturing device 110 of device 102. In this embodiment, recall that setting archive system 114 is present. The setting archive system stores information corresponding to prior values of the user-adjustable settings that have been used and the locations at which those setting were used. As such, context control system 112 may correlate the location information with information corresponding to prior values (stored by the setting archive system) that were effective at the location at a previous time that an image was captured. The user-adjustable settings may then be set to the prior values.

As a further example, FIG. 1 also depicts setting archive system 106, which is not resident onboard either device 102 or device 104. In this embodiment, setting archive system 106 is resident on another device (not shown), such as a server or an electronic device, for example. Regardless of the particular configuration, setting archive system 106 functions much like that described above with respect to system 114. However, in contrast to storing information correlating location and preset values of user-adjustable settings for use by the device on which the setting archive system resides, setting archive system 106 is able to provide information corresponding to values of user-adjustable settings for other devices to use. By way of example, setting archive system 106 may provide information corresponding to prior values and/or recommended values of user-adjustable settings that may be used by image capturing devices when at various locations. In this regard, a user may have a new image capturing device with factory presets, but recalls that various adjustments to presets were required to take good quality pictures at a particular venue with a previous device. When arriving at the venue, the new image capturing device may communicate with setting archive system 106 to acquire information corresponding to the prior values. Note that the prior values may be associated with this user, while in other embodiments the prior values may be associated with another user.

It should be noted that a setting archive system may be used to provide location-specified settings. For example, a user may operate their device in a museum—where automatic settings for indoor operation are established. For instance, the museum may disallow the use of flash—so this setting also could be set in the device. In some embodiments, a venue provides metadata to attach to the images to share the name of the venue, for example, or other venue information. With sophisticated indoor location mechanisms, it may be possible to share metadata when a user takes a picture. By way of example, in a museum when a user captures an image of a given art piece, metadata for that art piece or more specific location information (such as what room in the museum) may become associated with the image.

Figure 2:
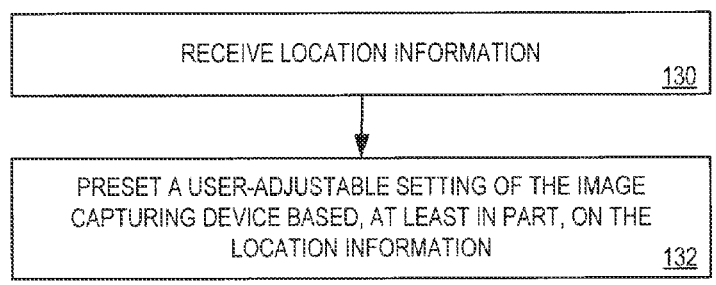
FIG. 2 is a flowchart depicting functionality (or method) that may be performed by an example embodiment of an imaging system.

FIG. 2 is a flowchart depicting functionality (or method) that may be performed by an example embodiment of an imaging system. As shown in FIG. 2, the method involves receiving location information (block 130). Notably, the location information corresponds to a location of an image capturing device. In block 132, a user-adjustable setting of the image capturing device is preset based, at least in part, on the location information. In this regard, preset involves setting the value before the user captures an image with the image capturing device and, in some embodiments, may be performed responsive to various inputs, such as the user turning on the device or the image capturing functionality, for example.

Figure 3:
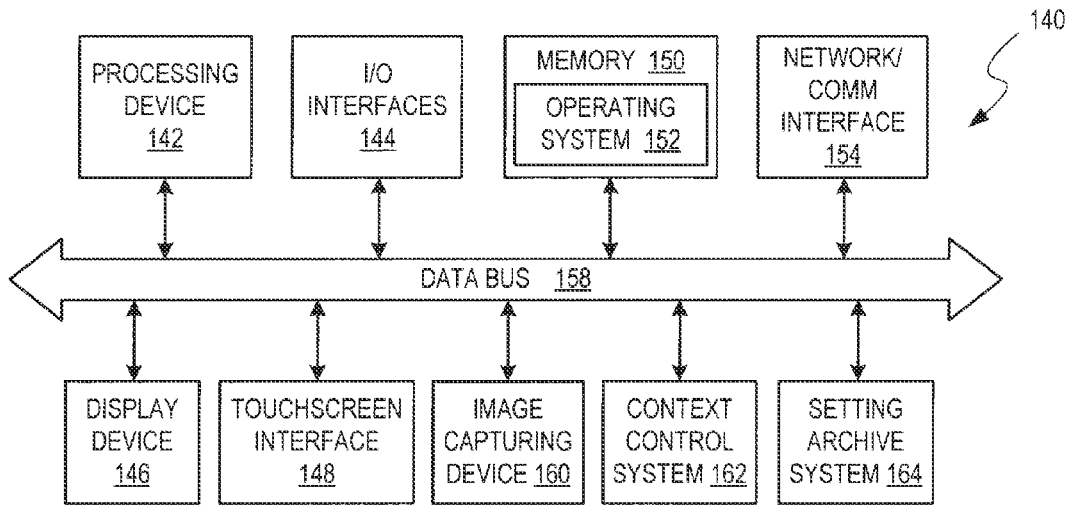
FIG. 3 is a schematic diagram of an example embodiment of an electronic device with a context control system.

FIG. 3 is a schematic diagram of an example embodiment of an electronic device. As shown in FIG. 3, electronic device 140 includes a processing device (processor) 142, input/output interfaces 144, a display device 146, a touchscreen interface 148, a memory 150, operating system 152, and a network/communication interface 154, with each communicating across a local data bus 158. Additionally, the system incorporates an image capturing device 160, a context control system 162 and a setting archive system 164.

The processing device 142 may include a custom made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 150 may include any one of a combination of volatile memory elements (e.g., random-access memory (RAM, such as DRAM, and SRAM, etc.)) and nonvolatile memory elements. The memory typically comprises native operating system 152, one or more native applications, emulation systems, or emulated applications for any of a variety of operating systems and/or emulated hardware platforms, emulated operating systems, etc. For example, the applications may include application specific software which may comprise some or all the components of the system. In accordance with such embodiments, the components are stored in memory and executed by the processing device.

Touchscreen interface 148 may be configured to detect contact within the display area of the display 146 and provides such functionality as on-screen buttons, menus, keyboards, soft-keys, etc. that allows users to navigate user interfaces by touch.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device.

With further reference to FIG. 3, network/communication interface device 154 may comprise various components used to transmit and/or receive data over a networked environment. By way of example, such components may include a wireless communications interface. When such components are embodied as an application, the one or more components may be stored on a non-transitory computer-readable medium and executed by the processing device.

In operation, image capturing device 160 is able to acquire image data responsive to user input. Notably, the image data is acquired based on values of user-adjustable settings that establish various image capture parameters. Context control system 162 is operative to receive location information corresponding to a location of image capturing device 160 and to preset at least one of the user-adjustable settings based, at least in part, on the location information. Notably, the context control system may receive information corresponding to preset values previously used from setting archive system 164, which correlates the location information with preset values previously used.

Figure 4:
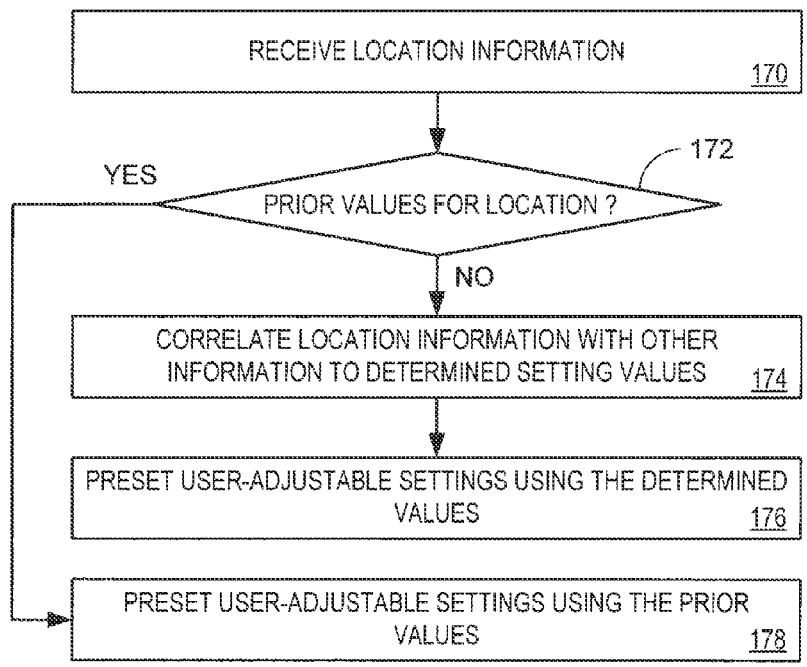
FIG. 4 is a flowchart depicting functionality that may be performed by the electronic device of FIG. 3.

FIG. 4 is a flowchart depicting functionality that may be performed by an example embodiment of a context control system, such as context control system 162 of FIG. 3. As shown in FIG. 4, the functionality (or method) may be construed as beginning at block 170, in which location information is received. In block 172, a determination is made as to whether prior values for user-adjustable settings are available for the location. If prior values are available, such as may be associated with a setting archive system, the process may proceed to block 178, in which the user-adjustable settings are preset to the prior values. In some embodiments, prior values may include values used by the device implementing the context control system or another device that was used for image capture, or recommended values that may not even be associated with an image capture device.

If it is determined in block 172 that prior values are not available, the process may proceed to block 174. In block 174, location information is correlated with other information in order to determine setting values. Such other information may include various types of information provided from various sources. This may include, but is not limited to, calendar information from a calendar application, sensor information from an onboard sensor, and time, among others. Thereafter, such as depicted in block 176, the user-adjustable settings are preset to the determined values.

If embodied in software, it should be noted that each block depicted in the flowchart of FIG. 4 (or any of the other flowcharts) represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

Figure 5:
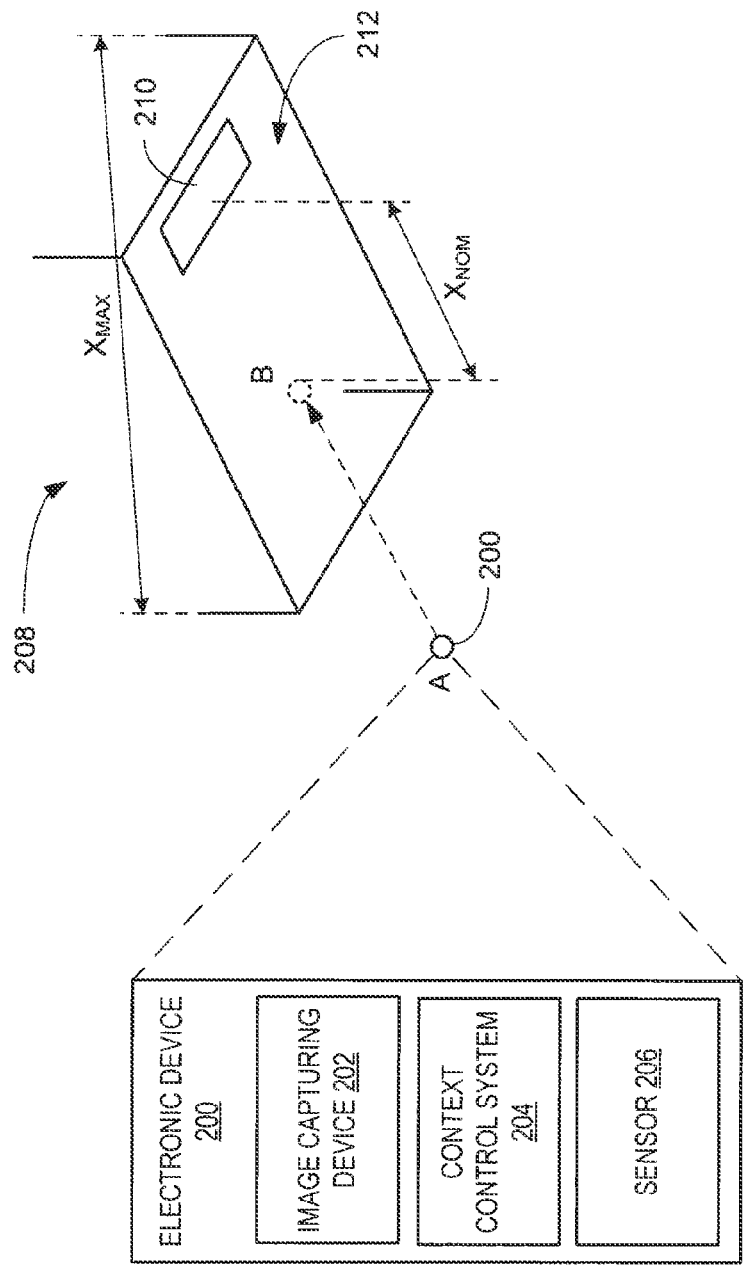
FIG. 5 is a schematic diagram of another example embodiment of an imaging system.

FIG. 5 is a schematic diagram of another example embodiment of an imaging system. As shown in FIG. 5, the system includes an electronic device 200 that incorporates an image capturing device 202, a context control system 204 and at least one sensor 206. The sensor is configured to acquire information about the environment about which the electronic device is located. By way of example, the sensor may be a light sensor.

In operation, context control system 204 of device 200 receives information corresponding to the location of the device and presets at least one a user-adjustable setting of the image capturing device based, at least in part, on the location. For instance, when the device determines the location to be location A, which is outdoors, the context control system may preset a focal length of the image capturing device at infinite to accommodate outdoor image capture. In some embodiments, input from the sensor also may be used.

As the device is moved to location B, which is inside of venue 208, and the user actuates the image capturing device, updated location information may cause the user-adjustable values to change. Note that, in this scenario, the venue is a performance center that exhibits a maximum interior distance ($X_{MAX}$) and a nominal interior distance ($X_{NOM}$), which extends from a seating position to a stage 210. The interior of the venue is designated as 212.

In some embodiments, the context control system may attempt to access prior values associated with image capturing device 202 when at location B. If none are available, the device may then attempt to access prior values made available by other image capturing devices and/or systems, such as those that may provide value recommendations. Additionally, or alternatively, the device may use information provided by sensor 206 in determining to what values the user-adjustable values should be preset.

It should be emphasized that the above-described embodiments are merely examples of possible implementations. Many variations and modifications may be made to the above-described embodiments without departing from the principles of the present disclosure. By way of example, the systems described may be implemented in hardware, software or combinations thereof. All such modifications and variations are intended to be included herein within the scope of this disclosure and protected by the following claims.

At least the following is claimed:

1. An image capturing system comprising:
    an image capturing device having a user-adjustable setting for altering an image capture parameter; and
    a context control system operative to automatically receive location information corresponding to a location of the image capturing device and to automatically preset the user-adjustable setting without input, corresponding to the user-adjustable setting, from a user of the image capturing device based, at least in part, on the location information;
    wherein:
    the user-adjustable setting is a focus setting; and
    the context control system is operative to automatically determine that the location information corresponds to an interior of a structure and to automatically preset the focus setting based on the location information such that a focal length of the image capturing device is less than a maximum dimension of the interior of the structure.

2. The system of claim 1, wherein upon the context control system is operative to preset the focus setting responsive to the image capturing device being activated.

3. The system of claim 1, wherein the context control system is further operative to correlate the location information with information corresponding to a prior value of the user-adjustable setting effective at the location at a previous time that an image was captured, and preset the user-adjustable setting to the prior value.

4. The system of claim 1, wherein:
    the system further comprises a setting archive system operative to store information corresponding to prior values of the user-adjustable setting effective at various locations; and
    the prior value of the user-adjustable setting is communicated, via a communication network, to the context control system.

5. The system of claim 4, wherein the prior value was used by the image capturing device to capture the image.

6. The system of claim 4, wherein the prior value is associated with a second image capturing device.

7. The system of claim 1, wherein:
the camera is an array-type camera; and
the user-adjustable setting is a configuration of the array-type camera.

8. The system of claim 1, wherein:
the context control system is further operative to preset a resolution setting to a high resolution responsive to automatically determining that a subsequent location of the image capturing device is outdoors.

9. The system of claim 1, wherein the image capturing device and the context control system are implemented on a smartphone.

10. A method for capturing images, comprising:
automatically receiving location information corresponding to a location of an image capturing device; and
automatically presetting a user-adjustable setting of the image capturing device without input, corresponding to the user-adjustable setting, from a user of the image capturing device based, at least in part, on the location information;
wherein:
the user-adjustable setting is a focus setting; and
automatically presetting comprises automatically determining that the location information corresponds to an interior of a structure and automatically presetting the focus setting based on the location information such that a focal length of the image capturing device is less than a maximum dimension of the interior of the structure.

11. The method of claim 10, wherein presetting the user-adjustable setting further comprises:
correlating the location information with information corresponding to a prior value of the user-adjustable setting effective at the location at a previous time that an image was captured; and
presetting the user-adjustable setting to the prior value.

12. The method of claim 11, wherein presetting the user-adjustable setting further comprises storing information corresponding to user-adjustable settings used at the location by the image capturing device.

13. The method of claim 11, wherein, in correlating the location information with information corresponding to a prior value, the prior value is associated with a second image capturing device.

14. The method of claim 11, wherein:
the method further comprises storing information corresponding to user-adjustable settings recommended for use at the location; and
in correlating the location information with information corresponding to a prior value, the prior value is associated with the recommended user-adjustable settings.

15. The method of claim 14, further comprising receiving information corresponding to the recommended user-adjustable settings via a communications network.

16. The method of claim 10, wherein presetting the user-adjustable setting of the image capturing device is further based, at least in part, on a current time.

17. The method of claim 10, wherein presetting the user-adjustable setting of the image capturing device is further based, at least in part, on sensor information obtained by a sensor of the image capturing device.

18. The method of claim 10, wherein presetting the user-adjustable setting of the image capturing device is further based, at least in part, on calendar information obtained by calendar application associated with a user of the image capturing device.

* * * * *